United States Patent
Munnannur et al.

(10) Patent No.: US 9,482,132 B2
(45) Date of Patent: Nov. 1, 2016

(54) GASEOUS REDUCTANT DELIVERY DEVICES AND SYSTEMS

(71) Applicant: Cummins Emission Solutions, Inc., Columbus, IN (US)

(72) Inventors: Achuth Munnannur, Madison, WI (US); Vinay Kumar Joshi, Pune (IN); Douglas A. Mitchell, Indianapolis, IN (US)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 92 days.

(21) Appl. No.: 14/074,154

(22) Filed: Nov. 7, 2013

(65) Prior Publication Data

US 2015/0121855 A1     May 7, 2015

(51) Int. Cl.
    *F01N 3/00*     (2006.01)
    *F01N 3/10*     (2006.01)
    (Continued)

(52) U.S. Cl.
    CPC .............. *F01N 3/208* (2013.01); *F01N 3/2066* (2013.01); *F01N 2240/20* (2013.01); *F01N 2570/14* (2013.01); *F01N 2570/145* (2013.01); *F01N 2610/02* (2013.01); *F01N 2610/06* (2013.01);
    (Continued)

(58) Field of Classification Search
    CPC ............. F01N 3/0842; F01N 2240/20; F01N 2610/02; F01N 1/166; F01N 3/2066; F01N 3/208; F01N 2610/06; F01N 2610/1453; F01N 2570/14; F02D 9/04
    USPC ........................... 60/286, 295, 301, 303, 324
    See application file for complete search history.

(56) References Cited

U.S. PATENT DOCUMENTS

| | | | | |
|---|---|---|---|---|
| 5,992,141 A | * | 11/1999 | Berriman et al. | 60/274 |
| 6,041,594 A | * | 3/2000 | Brenner et al. | 60/309 |
| 6,382,600 B1 | * | 5/2002 | Mahr | 261/78.2 |

(Continued)

FOREIGN PATENT DOCUMENTS

| EP | 0487886 | 6/1992 |
|---|---|---|
| EP | 0 900 923 | 3/1999 |

(Continued)

OTHER PUBLICATIONS

D. Needham, et al., Delphi SCR Dosing System—An alternative approach for close-coupled SCR catalyst systems, SIA Diesel International Conference, Rouen , Jun. 2012.

(Continued)

*Primary Examiner* — Thomas Denion
*Assistant Examiner* — Diem Tran
(74) *Attorney, Agent, or Firm* — Foley & Lardner LLP

(57) ABSTRACT

Systems and devices for delivering a fluid to an exhaust system. An inlet is configured for receiving the fluid, and a conduit includes openings for expelling the fluid into the exhaust system. A compact gaseous delivery system may include a first conduit in fluid communication with a fluid source, a second conduit in fluid communication with the first conduit, and a plurality of additional conduits in fluid communication with the second conduit and including a plurality of openings for expelling the fluid into the exhaust system. The first conduit, second conduit, and plurality of additional conduits may have axes that are substantially coplanar to form the compact gaseous delivery system that may be disposed within the exhaust system. Implementations may include openings with varying diameters. Other implementations may include a volute conduit with openings.

6 Claims, 8 Drawing Sheets

(51) Int. Cl.
*F01N 1/00* (2006.01)
*F01N 3/20* (2006.01)
(52) U.S. Cl.
CPC ........ *F01N 2610/1453* (2013.01); *Y02C 20/10* (2013.01); *Y02T 10/24* (2013.01)

(56) References Cited

U.S. PATENT DOCUMENTS

| | | | |
|---|---|---|---|
| 6,722,123 B2* | 4/2004 | Liu et al. | 60/286 |
| 7,448,207 B2* | 11/2008 | Jozsa et al. | 60/286 |
| 7,581,387 B2* | 9/2009 | Bui et al. | 60/286 |
| 7,743,603 B2 | 6/2010 | Nishina et al. | |
| 7,748,212 B2* | 7/2010 | Sedlacek et al. | 60/286 |
| 7,895,828 B2* | 3/2011 | Satou | 60/286 |
| 8,387,371 B2 | 3/2013 | Zhang et al. | |
| 8,393,142 B2 | 3/2013 | Mupparapu et al. | |
| 8,984,863 B2* | 3/2015 | Yukimura et al. | 60/286 |
| 2004/0177606 A1 | 9/2004 | Scharsack | |
| 2007/0036694 A1 | 2/2007 | Nishioka et al. | |
| 2011/0138790 A1 | 6/2011 | Radilli et al. | |
| 2011/0219745 A1 | 9/2011 | Griffin et al. | |
| 2011/0283689 A1 | 11/2011 | Wilkins | |
| 2012/0286063 A1 | 11/2012 | Wang et al. | |

FOREIGN PATENT DOCUMENTS

| | | |
|---|---|---|
| EP | 1612381 | 1/2006 |
| EP | 1956207 | 8/2008 |
| WO | WO-2013/000640 | 1/2013 |
| WO | WO-2013/112170 | 8/2013 |

OTHER PUBLICATIONS

Cummins Emission Solutions, EcoFit Urea Dosing System, Bulletin 4973772, Rev. 10/11, Oct. 2011.

The Extended European Search Report issued in European Patent Application No. 14191739.3, dated Mar. 19, 2015.

* cited by examiner

GASEOUS REDUCTANT DELIVERY DEVICES AND SYSTEMS

TECHNICAL FIELD

The present application relates generally to the field of automotive fluid delivery systems. More specifically, the present application relates to fluid delivery systems for selective catalytic reduction (SCR) systems.

BACKGROUND

In vehicles having internal combustion engines, such as diesel engines, nitrogen oxide ($NO_x$) compounds may be emitted in the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system of the vehicle. A reductant, such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber.

SUMMARY

One implementation relates to a compact gaseous delivery system. The system includes a first conduit having an inlet for receiving a fluid and a second conduit extending from a portion of the first conduit that is in fluid communication with the first conduit. The second conduit transports the fluid received by the inlet of the first conduit. A plurality of additional conduits extend from the second conduit and are in fluid communication with the first conduit and the second conduit. The plurality of additional conduits transport the fluid received by the inlet of the first conduit. Each additional conduit of the plurality of additional conduits has an outlet for expelling the fluid. The first conduit, the second conduit, and the plurality of additional conduits each have axes that may be substantially coplanar. The compact gaseous delivery system is configured to be disposed within a portion of an exhaust system.

Another implementation relates to a compact gaseous delivery device to be disposed within a portion of an exhaust system. The compact gaseous delivery device includes an inlet for receiving a gaseous reductant. The device further includes a first conduit extending from the inlet and having a plurality of openings along a length of the first conduit. The plurality of openings including a first opening with a first diameter, a second opening with a second diameter, and a third opening having a third diameter. The second diameter may be greater than the first diameter and the third diameter may be greater than the first diameter and the second diameter.

Yet a further implementation relates to a gaseous reductant delivery system for delivering a gaseous reductant into a portion of an exhaust system. The system includes a gaseous reductant source. The system also includes a first conduit in fluid communication with the gaseous reductant source and having an inlet at a first end for receiving a gaseous reductant from the gaseous reductant source. The system also includes a second conduit in fluid communication with the first conduit and that extends substantially perpendicular from a second end of the first conduit. A first plurality of additional conduits are in fluid communication with the first conduit and the second conduit. The first plurality of additional conduits extend substantially perpendicular from the second conduit. Each additional conduit of the first plurality of additional conduits has a first plurality of openings that are configured to release the gaseous reductant from the gaseous reductant source. The system further includes a third conduit in fluid communication with the first conduit and that extends substantially perpendicular from the second end of the first conduit and opposite the second conduit. A second plurality of additional conduits are in fluid communication with the first conduit and the third conduit. The second plurality of additional conduits extend substantially perpendicular from the third conduit. Each additional conduit of the second plurality of additional conduits has a second plurality of openings that are configured to release the gaseous reductant from the gaseous reductant source These and other features of the implementations described herein, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION OF VARIOUS EMBODIMENTS

Following below are more detailed descriptions of various concepts related to, and implementations of, methods, apparatuses, and systems for introducing a reductant, such as pure ammonia gas or a gaseous mixture such as an ammonia-air mixture or ammonia-nitrogen mixture, to an exhaust system. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
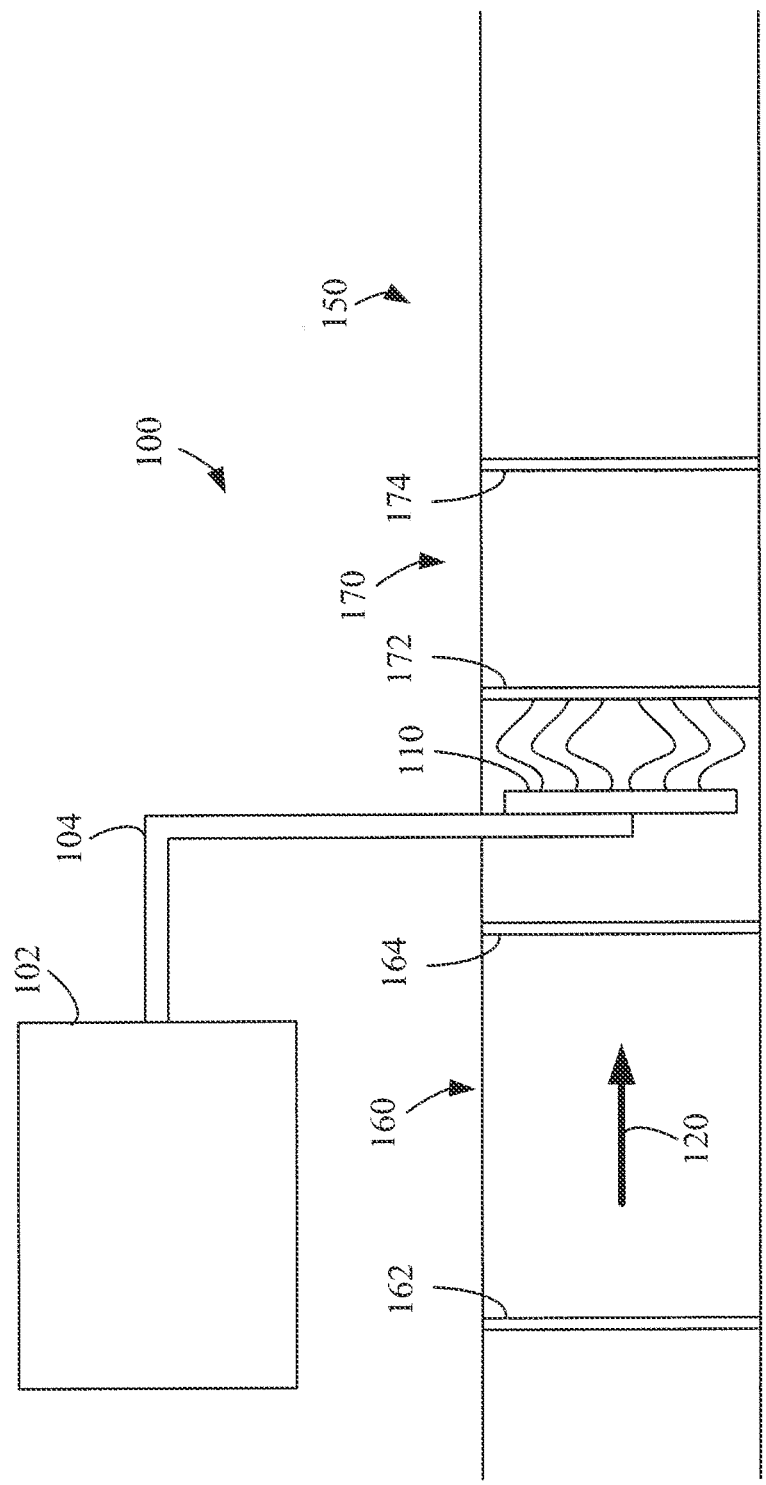
FIG. 1 is a block schematic diagram of an example reductant delivery system and a portion of an exhaust system.

FIG. 1 depicts an example reductant delivery system 100 for a SCR system having a gaseous reductant delivery device 110 disposed within a portion of an exhaust system 150. The gaseous reductant delivery device 110 is disposed within a portion of an exhaust system 150 of a vehicle to dose a reductant, such as gaseous ammonia, into the exhaust gases flowing (indicated by arrow 120) therein. In other implementations, the gaseous reductant delivery device 110 may be disposed in other exhaust systems, such as those of generators, marine vehicles, and/or any other internal combustion engine exhaust system.

In the example shown, the reductant delivery device 110 is in fluid communication with a gaseous reductant source 102, such as gaseous ammonia, an ammonia-air mixture, an ammonia-nitrogen mixture, etc., via line 104. In some implementations, the gaseous reductant source 102 may simply be a storage tank containing gaseous ammonia. In other implementations, the gaseous reductant source 102 may include multiple components such that the source of the gaseous reductant may be stored in another form, such as aqueous ammonia or urea, and is converted into gaseous ammonia prior to being expelled from the reductant deliver device 110. In some implementations, the gaseous reductant source 102 may include a control module configured to control the flow of gaseous reductant to the reductant delivery device 110. In some implementations, a compressed gas source, such as compressed air or nitrogen, may be included to assist in delivery of the gaseous reductant.

In the present example, the reductant delivery device 110 is disposed within a portion of the exhaust system 150 between a diesel particulate filter (DPF) portion 160 and a SCR catalyst portion 170. The DPF portion 160 includes a diesel particulate filter (DPF) in fluid communication with the exhaust system 150 to remove particulate matter, such as soot, from the exhaust gas. The DPF portions 160 includes a DPF inlet 162, where the exhaust gas is received, and a DPF outlet 164, where the exhaust gas exits after having particulate matter substantially filtered from the exhaust gas. The exhaust system 150 further includes an SCR catalyst portion 170 where an SCR catalyst is located that assists in the reduction of $NO_x$ emissions by accelerating a $NO_x$ reduction process between an ammonia compound, such as gaseous ammonia, aqueous ammonia, and/or urea, and the $NO_x$. The SCR catalyst portion 170 includes a SCR inlet 172 and a SCR outlet 174. The exhaust system 150 may further include a diesel oxidation catalyst (DOC) in fluid communication with the exhaust system 150 to oxidize hydrocarbons and carbon monoxide in the exhaust gas.

For the SCR catalyst of the SCR catalyst portion 170 to accelerate the reduction of $NO_x$ emissions, a reductant needs to be introduced with the exhaust gas. Such reductants include gaseous ammonia, urea, or other reductants. The reductant needs to be adequately dispersed within the exhaust gas for the chemical reaction between the reductant and the $NO_x$ emission compounds to occur once the exhaust gas enters the SCR catalyst portion 170. In some implementations, such as a system that uses urea, an aqueous urea solution or diesel exhaust fluid (DEF) is injected upstream of the SCR catalyst portion 170. The DEF droplets then undergo the processes of evaporation, thermolysis, and hydrolysis to form gaseous ammonia within the exhaust system 150. Direct injection of gaseous ammonia may provide a more efficient means of achieving the desired $NO_x$ reduction, provided a sufficient degree of mixing occurs between the reductant and the $NO_x$ emissions in the exhaust gas and a high degree of uniformity results prior to the mixture entering the SCR catalyst portion 170 via SCR inlet 172.

For exhaust systems that have sufficient length to permit adequate mixing, the gaseous reductant may be injected and mix as the exhaust gas and ammonia flow through the exhaust system. In other systems, a static mixing device, such as a baffle within the exhaust system, may be employed to assist the mixing of the gaseous reductant with the exhaust gas. However, for certain size-constrained systems (i.e., if the space for the exhaust system is limited), such dispersal of the reductant into the exhaust system may need to occur over a short distance that may not permit such static mixing devices to be used. Accordingly, it may be useful to use a compact, efficient system that produces a highly uniform distribution of gaseous reductant—pollutant mixture at the SCR inlet 172 of the SCR catalyst portion 170.

Figure 2:
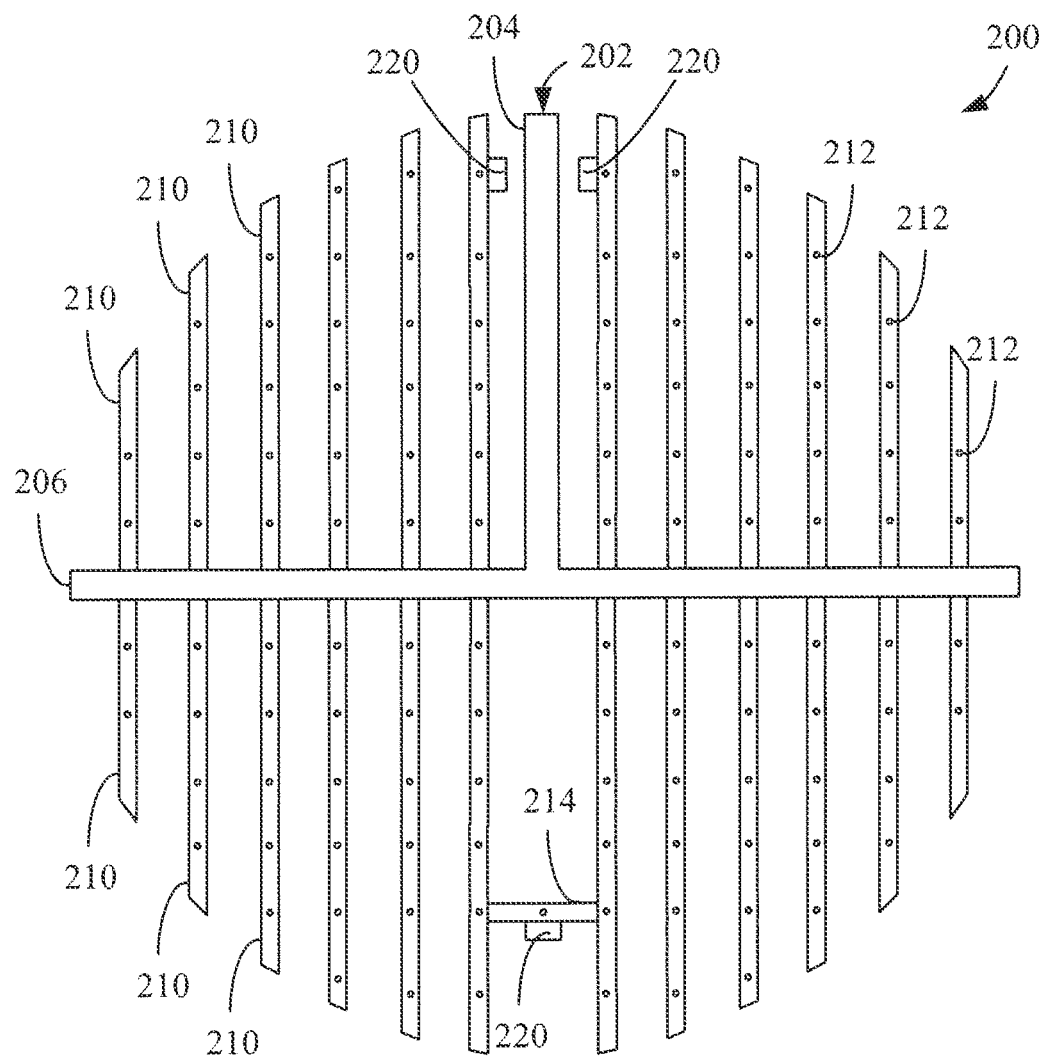
FIG. 2 is a front elevation view of an example gaseous reductant delivery device having a plurality of conduits and baffles.

FIG. 2 depicts an example of one such compact gaseous reductant delivery device 200 that may be deployed within the exhaust system 150 of FIG. 1 as the gaseous reductant delivery device 110. The gaseous reductant delivery device 200 includes an inlet 202, a first conduit 204, a second conduit 206, and a plurality of conduits 210. The inlet 202 is configured to be fluidly coupled to and in fluid communication with a gaseous reductant source, such as gaseous reductant source 102 of FIG. 1 via line 104. The first conduit 204 is in fluid communication with the inlet 202 and extends downwardly from the inlet 202. The second conduit 206 is in fluid communication with the first conduit 204 such that the second conduit 206 transports the gaseous reductant received at the inlet 202. In the present example, the second conduit 206 is coupled to the first conduit 204 at an end of the first conduit 204 that is opposite the inlet 202. The second conduit 206 extends outwardly in opposing directions relative to the coupling to the first conduit 204 such that the second conduit 206 and the first conduit 204 form a T shape with the second conduit 206 substantially perpendicular to the first conduit 204. In some implementations, a bluff body, such as bluff boy 708 shown in FIG. 7, may be added to the intersecting portion of the first conduit 204 and the second conduit 206. In some implementations, the second conduit 206 may have open ends or closed ends.

Several additional conduits 210 extend from the second conduit 206. Each additional conduit 210 is in fluid communication with the second conduit 206 and the first conduit 204 such that the each conduit 210 can transport the gaseous reductant received at the inlet 202. In the present example, the plurality of additional conduits 210 are substantially parallel. In addition, each additional conduit 210 of the plurality of additional conduits 210 is substantially perpendicular to the second conduit 206 and substantially parallel to the first conduit 604. Thus, it can be appreciated that the first conduit 204, the second conduit 206, and the plurality of additional conduits 210 may be defined by axes that are substantially coplanar. The plurality of additional conduits 210 are sized such that the ends of the additional conduits 210 form discrete segments for a circular shape such that the gaseous reductant delivery device 200 may be cross-sectionally disposed within a substantially circular portion (e.g., a tube) of the exhaust system maximizes the dispersal area. In some implementations, each additional conduit 210 may have an open end, opposite the fluid coupling to the second conduit 206, and/or each additional conduit 210 may have a closed end.

The first conduit 204, the second conduit 206, and/or the plurality of additional conduits 210 shown in FIG. 2 are tubular conduits, though any other cross-sectional shape for the first conduit 204, the second conduit 206, and/or the plurality of additional conduits 210 may be used, such as square conduits, rectangular conduits, triangular conduits, elliptical conduits, polygonal conduits, etc. In some implementations, the first conduit 204, the second conduit 206, and/or the plurality of additional conduits 210 may have a hydraulic diameter between one millimeter, inclusive, and five millimeters, inclusive. In some implementations, a cross-member 214 may fluidly couple and be in fluid communication with two or more additional conduits 210 of the plurality of additional conduits 210. In the example shown, a single cross-member 214 is depicted fluidly coupling the two bottom innermost additional conduits 210 together. In other implementations, a pair of cross-members 214 may fluidly couple the two bottom innermost additional conduits 210. In still other implementations, other cross-members 214 may fluidly couple other additional conduits 210. The cross-member 214 may also be omitted.

Each additional conduit 210 of the plurality of additional conduits 210 includes one or more openings 212 along the length of each additional conduit 210. In some implementations, each additional conduit 210 of the plurality of additional conduits 210 includes three or more openings 212. In the example shown in FIG. 2, the outermost additional conduits 210 of the plurality of additional conduits 210 have two openings 212 and the innermost additional conduits 210 of the plurality of additional conduits 210 have six openings 212. The openings 212 may be of any shape, including circular openings, square openings, elliptical openings, triangular openings, rectangular openings, etc. Each opening 212 may have a hydraulic diameter between 0.5 millimeters, inclusive, and 1 millimeter, inclusive. In some implementations, the diameters of the openings 212 for an additional conduit 210 may vary in size, such as increasing hydraulic diameters along the length of the additional conduit 210 or decreasing hydraulic diameters along the length of the additional conduit 210. For example, a first opening 212 of the plurality of openings 212 of an additional conduit 210 may have a first hydraulic diameter of 0.5 millimeter, a second opening 212 of the plurality of openings 212 may have a second hydraulic diameter of 0.75 millimeter, and a third opening 212 of the plurality of openings 212 may have a third hydraulic diameter of 1 millimeter. In other implementations, the hydraulic diameters of the plurality of openings 212 can vary based on radial distance from a point, such as where the second conduit 206 is coupled to the first conduit 204. In still further implementations, the hydraulic diameters of the plurality of openings 212 may be substantially the same. The openings 212 may be substantially parallel relative to the flow of the exhaust gas and positioned on the additional conduits 210 away from the flow of the exhaust gas (i.e., on the downstream side of the conduit 210). In other implementations, the openings 212 may be provided on the additional conduits 210 at nonparallel angles relative to the flow of the exhaust gas, such as between 90° (i.e., perpendicular relative to the flow of the exhaust gas), inclusive, and 0° (i.e., parallel relative to the flow of the exhaust gas), inclusive, relative to the flow of the exhaust gas. In some implementations, several openings 212 may be provided at the same vertical location of an additional conduit 210 at multiple angles (e.g., two openings 212 at 45° angles).

In the implementation of the gaseous reductant delivery device 200 shown, the device 200 includes several baffles 220. The baffles 220 may include flat members extending from one or more of the additional conduits 210 of the plurality of additional conduits 210. In some implementations, the baffles 220 may have dimensions of five millimeters by ten millimeters. Baffles could be rectangular, circular, triangular, any other closed form shape, or any other configuration. In other implementations, the baffles 220 may have dimensions of five millimeters by fifteen millimeters, ten millimeters by fifteen millimeters, or any other dimension. As shown in FIG. 2, three baffles 220 are provided, including a baffle extending from the cross-member 214. The baffles 220 are configured to enhance turbulence in the flow of the exhaust gas to improve mixing of the dispersed gaseous reductant and the exhaust gas. In some implementations, guide vanes may also be included to enhance turbulence in the flow of the exhaust gas to improve mixing of the dispersed gaseous reductant and the exhaust gas. The baffles 220 and/or guide vanes may also be omitted.

Figure 3:
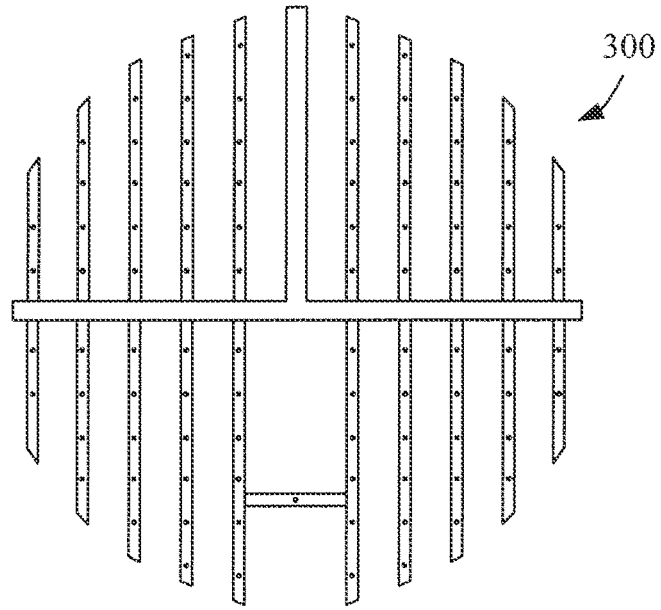
FIG. 3 is a front elevation view of another example gaseous reductant delivery device having a plurality of conduits.
Figure 4:
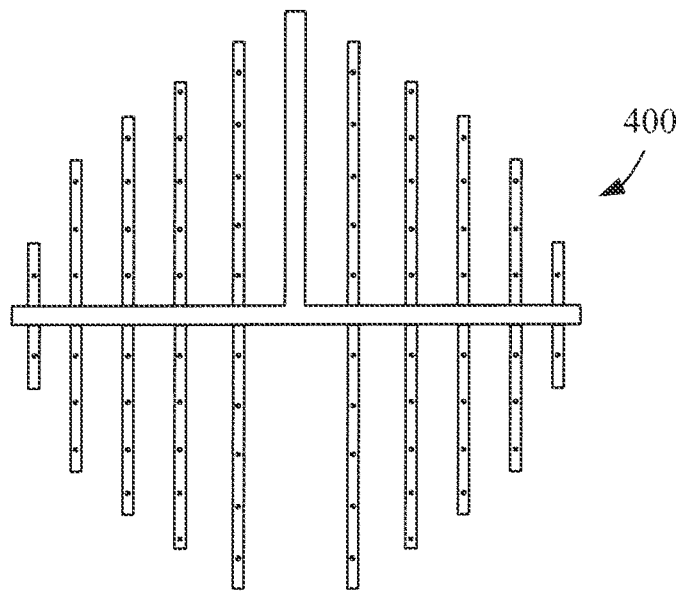
FIG. 4 is a front elevation view of still another example gaseous reductant delivery device having a plurality of conduits.
Figure 5:
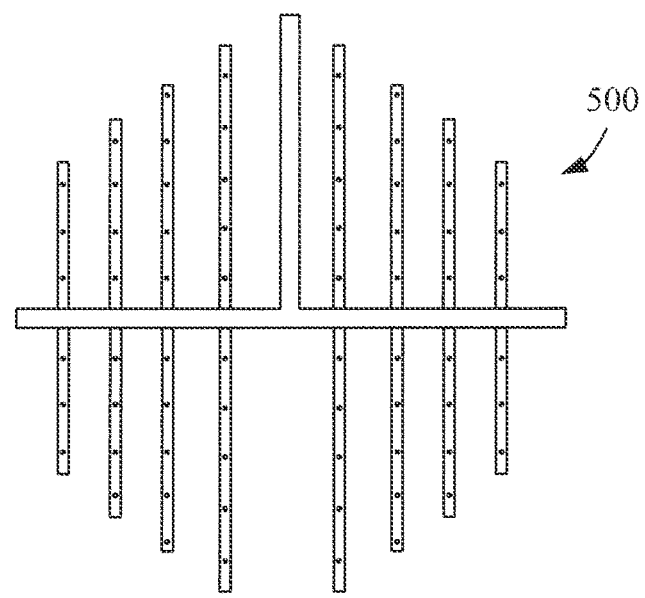
FIG. 5 is a front elevation view of yet another example gaseous reductant delivery device having a plurality of conduits.

FIGS. 3-5 depict other implementations of gaseous reductant introduction devices 300, 400, 500. FIG. 3 depicts a gaseous reductant introduction device 300 similar to the gaseous reductant introduction device 200, but with the baffles omitted and less additional conduits. That is, in the particular implementation of FIG. 3, twenty additional conduits are in fluid communication with the second conduit. It should be appreciated, however, that other numbers of additional conduits could be used. FIGS. 4-5 depicts gaseous reductant introduction devices 400, 500 with the plurality of additional conduits having squared ends and omitting the cross-member. In the particular implementation of FIG. 4, twenty additional conduits are in fluid communication with the second conduit. It should be appreciated, however, that other numbers of additional conduits could be used. In the particular implementation of FIG. 5, sixteen additional conduits are in fluid communication with the second conduit. Again, it should be appreciated that other numbers of additional conduits could be used.

Figure 6:
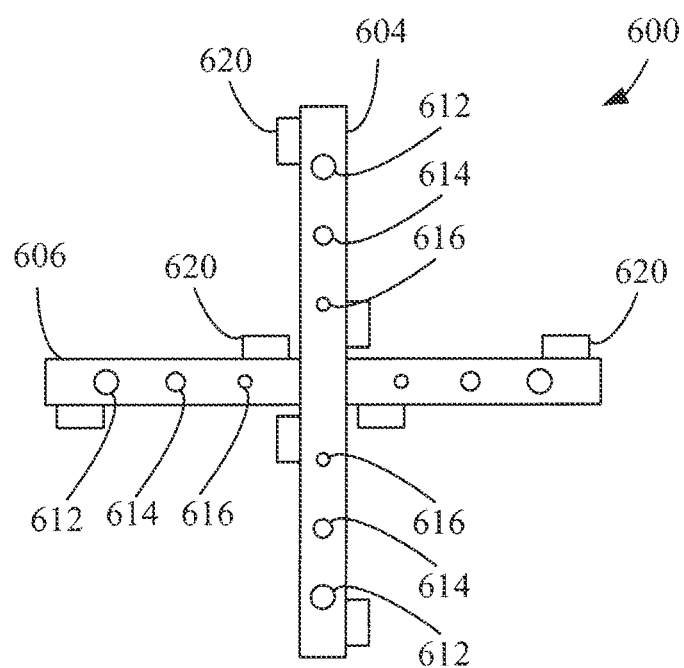
FIG. 6 is a front elevation view of an example gaseous reductant delivery device having a first conduit and second conduit, increasing diameter openings, and baffles.

FIG. 6 depicts still another implementation of a gaseous reductant introduction device 600. The gaseous reductant delivery device 600 includes an inlet (not shown), a first conduit 604, a second conduit 606, a plurality of baffles 620, and a plurality of openings 612, 614, 616. The inlet is configured to be fluidly coupled to and in fluid communication with a gaseous reductant source, such as gaseous reductant source 102 of FIG. 1 via line 104. The inlet of the gaseous reductant introduction device 600 of FIG. 6 is located behind the intersection of the first conduit 604 and the second conduit 606. The first conduit 604 is in fluid communication with the inlet. The second conduit 606 is coupled to the first conduit 604 and in fluid communication with the first conduit 604 such that the second conduit 606 transports the gaseous reductant received at the inlet. In the present example, the second conduit 606 is coupled to the first conduit 604 at approximately a midpoint of the first conduit 604. The second conduit 606 is substantially perpendicular to the first conduit 604.

The first conduit 604 and the second conduit 606 shown in FIG. 6 are tubular conduits, though any other cross-sectional shape for the first conduit 604 and the second conduit 606 may be used, such as square conduits, rectangular conduits, triangular conduits, elliptical conduits, polygonal conduits, etc. In some implementations, the first conduit 604 and the second conduit 606 may have a hydraulic diameter between one millimeter, inclusive, and five millimeters, inclusive.

The first conduit 604 includes one or more openings 612, 614, 616 along the length the first conduit 604. In some implementations, the first conduit 604 includes three or more openings 612, 614, 616. In the example shown in FIG. 6, the first conduit 604 has a first set of openings 612, 614, 616 for an upper portion and a second set of openings 612, 614, 616 for a lower portion. The openings 612, 614, 616 may be of any shape, including circular openings, square openings, elliptical openings, triangular openings, rectangular openings, etc. Each opening 612, 614, 616 may have a hydraulic diameter between 0.5 millimeters, inclusive, and 1 millimeter, inclusive. In some implementations, the diameters of the openings 612, 614, 616 for the first conduit 604 may vary in size, such as increasing hydraulic diameters along the length of the first conduit 604 or decreasing hydraulic diameters along the length of the first conduit 604. For example, a first opening 612 of the first conduit 604 may have a first hydraulic diameter of 1 millimeter, a second opening 614 may have a second hydraulic diameter of 0.75 millimeter, and a third opening 616 may have a third hydraulic diameter of 0.5 millimeter. In other implementations, the hydraulic diameters of the openings 612, 614, 616 may be substantially the same. The openings 612, 614, 616 may be substantially parallel relative to the flow of the exhaust gas and positioned on the first conduit 604 away from the flow of the exhaust gas (i.e., on the downstream side of the first conduit 604). In other implementations, the openings 612, 614, 616 may be provided on the first conduit 604 at non-parallel angles relative to the flow of the exhaust gas, such as between 90° (i.e., perpendicular relative to the flow of the exhaust gas), inclusive, and 0° (i.e., parallel relative to the flow of the exhaust gas), inclusive, relative to the flow of the exhaust gas. In some implementations, several openings 612, 614, 616 may be provided at the same vertical location of the first conduit 604 at multiple angles (e.g., two openings 212 at 45° angles).

The first conduit 604 further includes several baffles 620. The baffles 620 may include flat members extending from one or more portions of the first conduit 604. In some implementations, the baffles 620 may have dimensions of five millimeters by ten millimeters. In other implementations, the baffles 620 may have dimensions of five millimeters by fifteen millimeters, ten millimeters by fifteen millimeters, or any other dimension. As shown in FIG. 6, the first conduit 604 includes a baffle 620 substantially near each end of the first conduit 604 and another baffle 620 substantially near the intersection of the first conduit 604 with the second conduit 606. The baffle 620 at a first portion, such as substantially near the end of the first conduit 604, and the baffle 620 at a second portion, such as substantially near the intersection of the first conduit 604 and the second conduit 606, may be on substantially opposing sides of the first conduit 604 such that the baffles 620 are substantially opposite each other. The baffles 620 extend in a plane that is substantially coplanar to the axis defining the first conduit 604. The baffles 620 are configured to enhance turbulence in the flow of the exhaust gas to improve mixing of the dispersed gaseous reductant and the exhaust gas. In some implementations, guide vanes may also be included to enhance turbulence in the flow of the exhaust gas to improve mixing of the dispersed gaseous reductant and the exhaust gas. The baffles 620 and/or guide vanes may also be omitted.

The second conduit 606 may be configured with openings 612, 614, 616 and baffles 620 in substantially the same manner as the first conduit 604.

Figure 7:
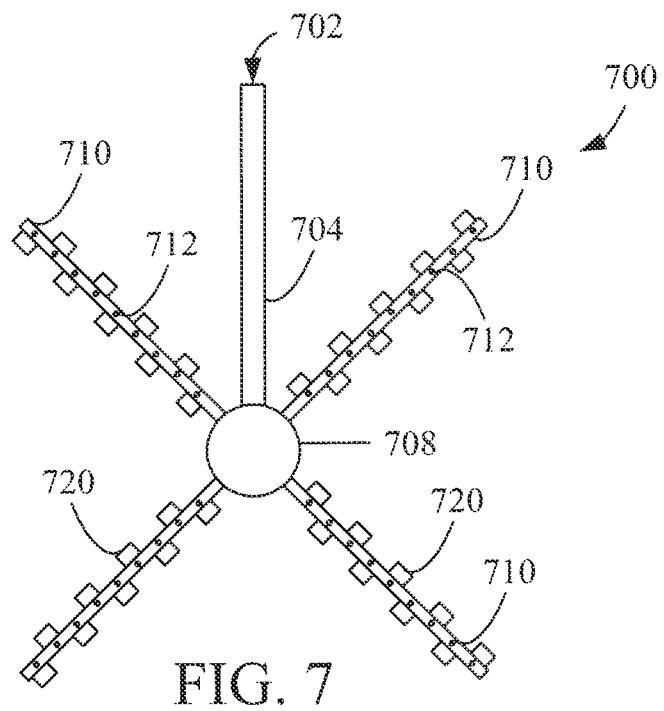
FIG. 7 is a front elevation view of an example gaseous reductant delivery device having an X-shape and a plurality of baffles.

FIGS. 7-10 depict further implementations of gaseous reductant introduction devices 700, 800, 900, 1000. FIG. 7 depicts a gaseous reductant introduction device 700 having an X-shaped configuration with an inlet 702, a first conduit 704, a bluff body 708, a plurality of additional conduits 710 extending from the bluff body 708 and the first conduit 704, a plurality of openings 712, and a plurality of baffles 720. The inlet 702 is configured to be fluidly coupled to and in fluid communication with a gaseous reductant source, such as gaseous reductant source 102 of FIG. 1 via line 104. The first conduit 704 is in fluid communication with the inlet 702 and extends downwardly from the inlet 702. The plurality of additional conduits 710 are in fluid communication with the first conduit 704 such that the plurality of additional conduits 710 transport the gaseous reductant received at the inlet 702. In the present example, the plurality of additional conduits 710 are coupled to the first conduit 704 at an end of the first conduit 704 that is opposite the inlet 702. A bluff body 708 is coupled to the first conduit 704 and/or the plurality of additional conduits 710 at the fluid coupling region of the first conduit 704 with the plurality of additional conduits 710. The bluff body is a substantially cylindrical body, such as a cylinder with a diameter of approximately 25 millimeters, such as 25.4 millimeters, and is configured to enhance turbulence in the flow of the exhaust gas to improve mixing of the dispersed gaseous reductant and the exhaust gas. Of course other geometric configurations for the bluff body 708 may be implemented as well, such as square bluff bodies, triangular bluff bodies, polygonal bluff bodies, etc.

The openings 712 may be configured in a similar manner to openings 212 and/or openings 612, 614, 616. A plurality of baffles 720 extend from each additional conduit 710 of the plurality of additional conduits 710 and, in the present example, alternate along the length of the additional conduit 710. The baffles 720 may be configured in a similar manner to baffles 220 and/or baffles 620.

Figure 8:
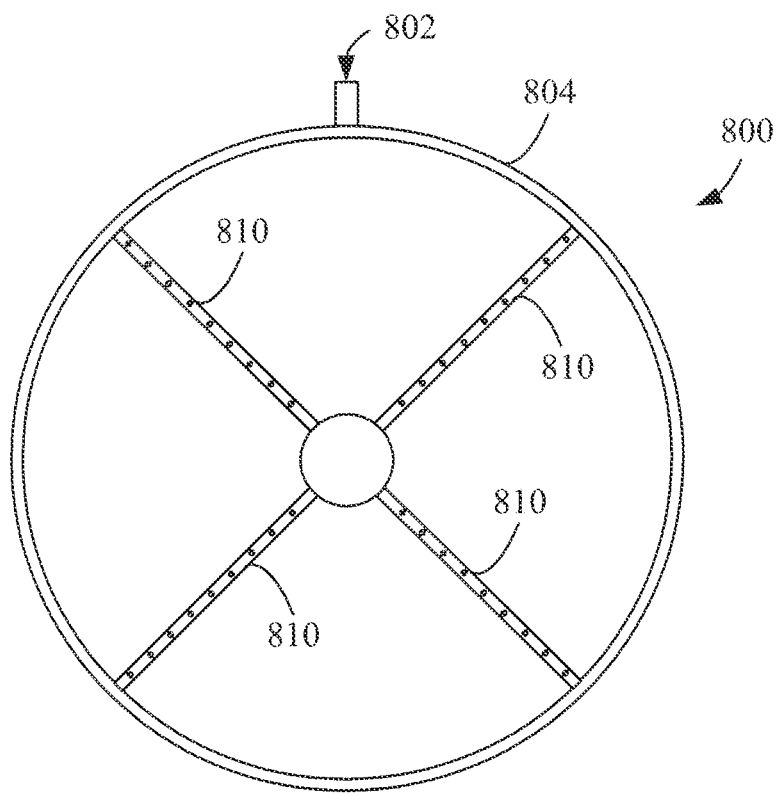
FIG. 8 is a front elevation view of an example gaseous reductant delivery device having an X-shape and a circular conduit.

FIG. 8 depicts a gaseous reductant introduction device 800 similar to gaseous reductant introduction device 700, but with a circular conduit 804 fluidly coupled to the inlet 802 and the plurality of additional conduits 810. In addition, the plurality of baffles are omitted. In some implementations, one or more baffles may extend from the circular conduit 804. The circular conduit 804 may include a plurality of openings that may be configured in a similar manner to openings 212 and/or openings 612, 614, 616. In the particular implementation of FIG. 8, four additional conduits are in fluid communication with the circular conduit 804. It should be appreciated, however, that other numbers of additional conduits could be used.

Figure 9:
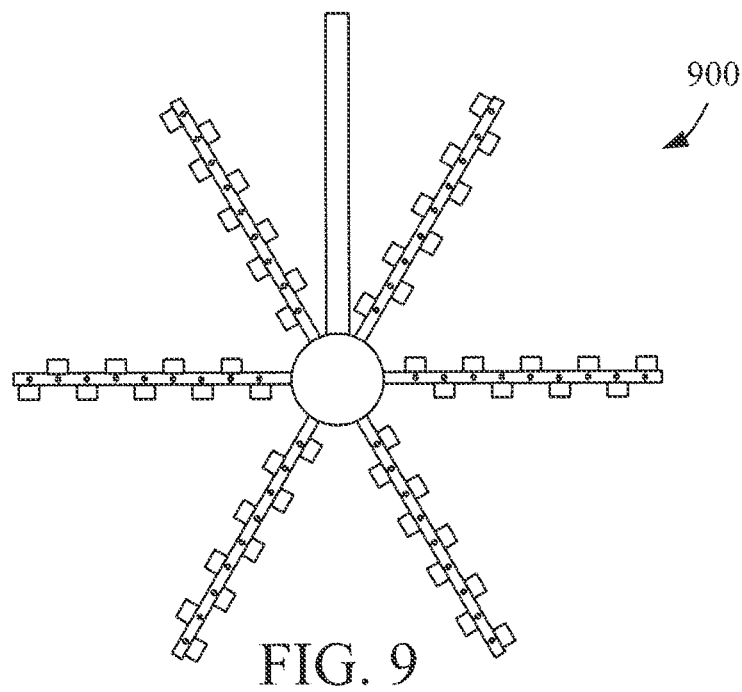
FIG. 9 is a front elevation view of an example gaseous reductant delivery device having a hexagonal configuration and a plurality of baffles.

FIG. 9 depicts a gaseous reductant introduction device 900 substantially similar to gaseous reductant introduction device 700, but with a hexagonal configuration. That is, in the particular implementation of FIG. 9, six additional conduits are in fluid communication with the first conduit. It should be appreciated, however, that other numbers of additional conduits could be used.

Figure 10:
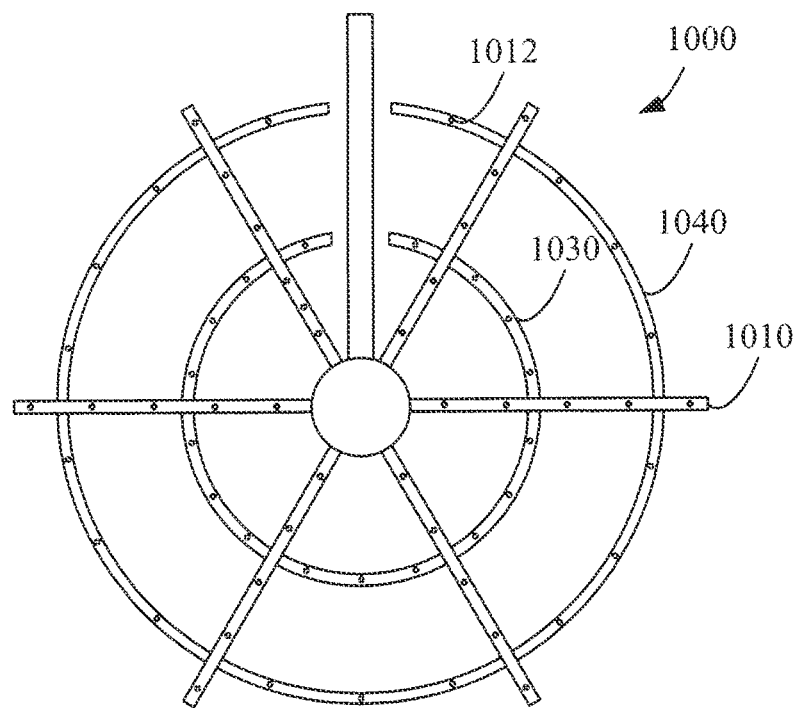
FIG. 10 is a front elevation view of an example gaseous reductant delivery device having a hexagonal configuration, an outer circular conduit, and an inner circular conduit.

FIG. 10 depicts a gaseous reductant introduction device 1000 similar to gaseous reductant introduction device 900, but with an outer circular conduit 1040 and an inner circular conduit 1030 each being fluidly coupled to and in fluid communication with the plurality of additional conduits 1010. In the particular implementation of FIG. 10, six additional conduits 1010 are in fluid communication with the first conduit, the outer circular conduit 1040, and the inner circular conduit 1030. Each additional conduit 1010 of the plurality of additional conduits 1010 include a plurality of openings 1012 that may be configured in a similar manner to openings 212 and/or openings 612, 614, 616. It should be appreciated, however, that other numbers of additional conduits 1010 could be used. The outer circular conduit 1040 and the inner circular conduit 1030 each include a plurality of openings 1012 that may be configured in a similar manner to openings 212 and/or openings 612, 614, 616. In some implementations, one or more baffles may extend from one or more additional conduit 1010 of the plurality of additional conduits 1010, the outer circular conduit 1040, and/or the inner circular conduit 1030.

Figure 11:
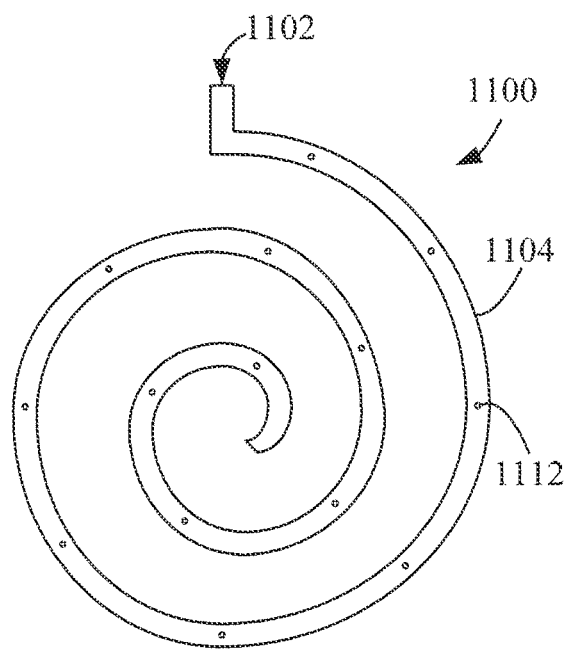
FIG. 11 is a front elevation view of an example gaseous reductant delivery device having a volute configuration.

FIG. 11 depicts still another implementation of a gaseous reductant introduction device 1100. The gaseous reductant introduction device 1100 includes an inlet 1102, a first conduit 1104 having a volute configuration, and a plurality of openings 1112 in the first conduit 1104. The inlet 1102 is configured to be fluidly coupled to and in fluid communication with a gaseous reductant source, such as gaseous reductant source 102 of FIG. 1 via line 104. The first conduit 1104 is in fluid communication with the inlet 1102 and spirals inwardly to form the volute configuration. The plurality of openings 1112 that may be configured in a similar manner to openings 212 and/or openings 612, 614, 616. In some implementations, one or more baffles may extend from the volute first conduit 1104.

Figure 12:
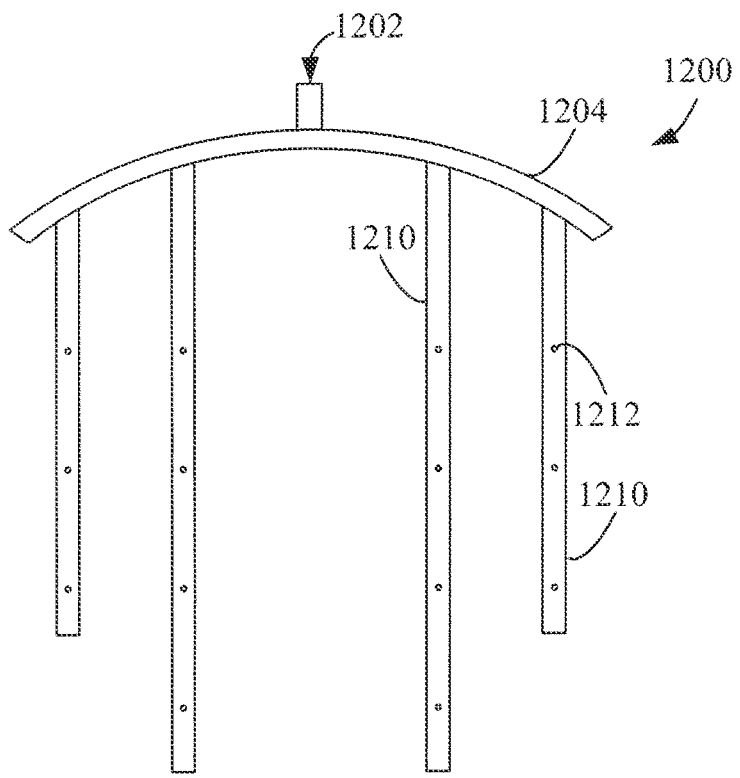
FIG. 12 is a front elevation view of an example gaseous reductant delivery device having a set of parallel bars extending from an arcuate conduit.

FIG. 12 depicts yet a further implementation of a gaseous reductant introduction device 1200. The gaseous reductant introduction device 1200 includes an inlet 1202, a first conduit 1204 having an arcuate configuration, and a plurality of additional conduits 1210 having a plurality of openings 1212. The inlet 1202 is configured to be fluidly coupled to and in fluid communication with a gaseous reductant source, such as gaseous reductant source 102 of FIG. 1 via line 104. The first conduit 1204 is in fluid communication with the inlet 1202 and has a downward arcing configuration. The plurality of conduits additional 1210 are in fluid communication with the first conduit 1204 such that the plurality of additional conduits 1210 transport the gaseous reductant received at the inlet 1202. In the present example, the plurality of additional conduits 1210 are coupled to the first conduit 1204 along the arc formed by the first conduit 1204 and extend downwardly. Each additional conduit 1210 of the plurality of additional conduits 1210 includes one or more openings 1212. In the example shown, each additional conduit 1210 includes three or more openings 1212. The openings 1112 that may be configured in a similar manner to openings 212 and/or openings 612, 614, 616. In some implementations, one or more baffles may extend from an additional conduit 1210 and/or the first conduit 1204.

Figure 13:
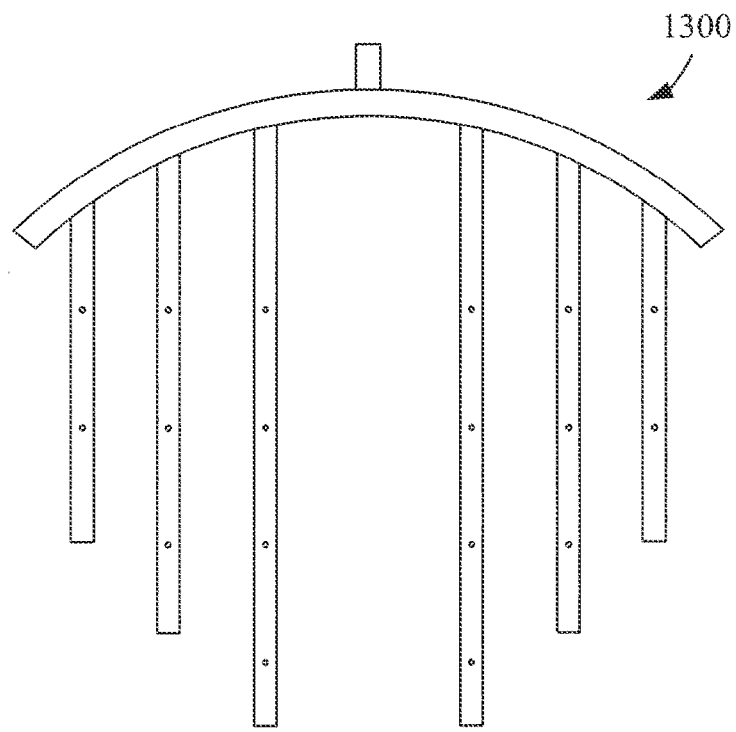
FIG. 13 is a front elevation view of another example gaseous reductant delivery device having a set of parallel bars extending from an arcuate conduit.

FIG. 13 depicts still another implementation of a gaseous reductant introduction device 1300 that is substantially similar to the gaseous reductant introduction device 1200 that includes additional conduits in fluid communication with the arcuate first conduit. In the particular implementation of FIG. 13, six additional conduits are in fluid communication with the arcuate first conduit. It should be appreciated, however, that other numbers of additional conduits could be used.

Figure 14:
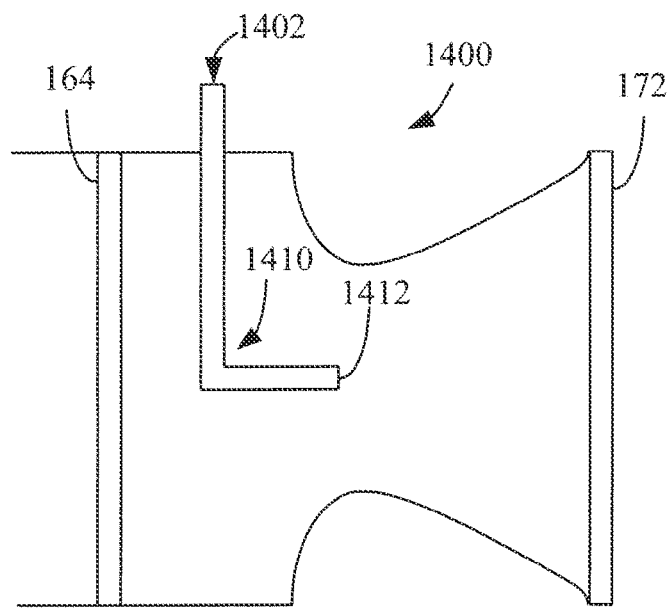
FIG. 14 is a side elevation view of an example gaseous reductant delivery device disposed in a venturi-shaped portion of an exhaust system with a perforated conduit.

FIG. 14 depicts still another gaseous reductant delivery device 1410 disposed within a portion 1400 of an exhaust system. The gaseous reductant delivery device 1410 is disposed within the portion 1400 of the exhaust system between the DPF outlet 164 of the DPF portion and the SCR inlet 172 of the SCR catalyst portion. In other implementations, the gaseous reductant delivery device 1410 may be disposed within other portions of the exhaust system. For example, the gaseous reductant delivery device 1410 may be positioned up-stream of the SCR inlet 172 for any aftertreatment configuration for the exhaust system, such as an exhaust system without a diesel particulate filter. The gaseous reductant delivery device 1410 shown in FIG. 14 includes an inlet 1402 that is configured to be fluidly coupled to and in fluid communication with a gaseous reductant source, such as gaseous reductant source 102 of FIG. 1 via line 104. The gaseous reductant delivery device 1410 further includes a conduit 1412 having a plurality of openings formed in the conduit 1412 to permit a gaseous reductant to be released. The openings may be configured in a similar manner to openings 212 and/or openings 612, 614, 616. In some implementations, one or more baffles may extend from the conduit 1412. The portion 1400 of the exhaust system is configured in a venturi shape. The venturi-shaped portion 1400 includes a converging and diverging portion with the conduit 1412 located substantially near the center of the venturi-shaped portion 1400 such that the gaseous reductant released by the perforated conduit 1412 mixes with the accelerated exhaust gas traveling through the venturi-shaped portion 1400. The venturi-shaped portion 1400 may be implemented in exhaust systems utilizing other gaseous reductant delivery devices described herein, such as gaseous reductant delivery devices 200, 300, 400, 500, 600, 700, 800, 900, 1000, 1100, 1200, 1300.

One or more of the gaseous reductant delivery devices 200, 300, 400, 500, 600, 700, 800, 900, 1000, 1100, 1200, 1300, 1400 can be used in compact aftertreatment systems to bring improvements to de-$NO_x$ efficiency and fuel efficiency, as well as to reduce ammonia slip. Such gaseous reductant delivery devices 200, 300, 400, 500, 600, 700, 800, 900, 1000, 1100, 1200, 1300, 1400 may provide high uniformity at the SCR inlet 172 with improved mixing between the reductant, such as gaseous reductant, and pollutants in the exhaust gas. Such gaseous reductant delivery devices 200, 300, 400, 500, 600, 700, 800, 900, 1000, 1100, 1200, 1300, 1400 are minimally intrusive and fit within tight packaging limits of exhaust systems while meeting de-$NO_x$ targets.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the portion of the reductant delivery system and the reductant delivery devices as shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A compact gaseous delivery device to be disposed within a portion of an exhaust system, the device comprising:
   an inlet for receiving a gaseous reductant;
   a first conduit extending from the inlet, the first conduit having a plurality of openings along a length of the first conduit, the plurality of openings including a first opening with a first diameter, a second opening with a second diameter, and a third opening having a third diameter, the second diameter being greater than the first diameter and the third diameter being greater than the first diameter and the second diameter; and
   a second conduit in fluid communication with the first conduit and extending perpendicular from the first conduit, the second conduit having a second plurality of openings along a length of the second conduit, the second plurality of openings including a fourth opening with a fourth diameter, a fifth opening with a fifth diameter, and a sixth opening having a sixth diameter, the fifth diameter being greater than the fourth diameter and the sixth diameter being greater than the fourth diameter and the fifth diameter, wherein the second conduit intersects with and is in fluid communication with the first conduit at a midpoint of the first conduit.

2. The device of claim 1, wherein the first conduit is volute.

3. The device of claim 1, wherein the gaseous reductant comprises at least one of gaseous ammonia, an ammonia-air mixture, or an ammonia-nitrogen mixture.

4. The device of claim 1 further comprising a plurality of baffles extending from the first conduit, the plurality of baffles extending in a plane that is coplanar with axes of the first conduit and the second conduit.

5. The device of claim 4, wherein a first baffle of the plurality of baffles extends from a first portion of the first conduit and a second baffle of the plurality of baffles extends from a second portion of the first conduit, the first portion being opposite the second portion.

6. The device of claim 5, wherein the first conduit intersects with and is in fluid communication with the second conduit at a midpoint of the second conduit.

* * * * *